United States Patent [19]
Eguchi

[11] Patent Number: 5,070,416

[45] Date of Patent: Dec. 3, 1991

[54] ERASING PREVIOUSLY RECORDED SIGNAL IN APPARATUS FOR PULSE TRAIN RECORDING OF DIGITAL SIGNAL

[75] Inventor: Takeo Eguchi, Kanagawa, Japan

[73] Assignee: Sony Corporation, Tokyo, Japan

[21] Appl. No.: 358,958

[22] Filed: May 30, 1989

[30] Foreign Application Priority Data

May 31, 1988 [JP] Japan ............................. 63-133922

[51] Int. Cl.[5] ........................ G11B 5/03; G11B 5/02

[52] U.S. Cl. ...................................... 360/66; 360/68

[58] Field of Search ........................... 360/46, 66–68, 360/14.1, 51

[56] References Cited

U.S. PATENT DOCUMENTS 4,782,403 11/1988 Masegawa et al. .................. 360/66

OTHER PUBLICATIONS

Japanese Unexamined Patent Publication No. 36312/1984.

Takeo Eguchi, Hirofumi Takekoshi, "Towards Take off of the 4:2:2 DVTR", 1985, pp. 266–268.

*Primary Examiner*—Aristotelis Psitos
*Assistant Examiner*—Won Tae C. Kim
*Attorney, Agent, or Firm*—Alvin Sinderbrand; William S. Frommer

[57] ABSTRACT

A signal recording device adapted for recording of pulse train signals on a recording medium by a rotating recording magnet head, includes an erasing magnet head integral with the recording magnetic head and which, during a recording operation, performs an erasure operation during the reference level period of the pulse train recording to achieve an optimum signal recording with a lesser power consumption.

11 Claims, 4 Drawing Sheets

TP Vcc Icc IH IL WR WE IE HR HE 56 57 46 47 48 IH IL IE 51 49 50 59 58 43 44 45 VEE 40 41 42 52 53 54 55 NRZ DATA CLOCK RE ICO

ERASING PREVIOUSLY RECORDED SIGNAL IN APPARATUS FOR PULSE TRAIN RECORDING OF DIGITAL SIGNAL

BACKGROUND OF THE INVENTION

1. Field of the Invention

This invention relates to a digital signal recording apparatus for recording an input signal on a recording medium in the form of a pulse train recording.

2. Description of the Prior Art

Up to now, various signal recording apparatus for recording signals on a recording medium by a rotating magnetic head have been investigated and put into practice. In video tape recorders (VTRs), for example, signals are recorded obliquely on a magnetic tape by plural recording magnetic heads provided at predetermined positions on a rotating drum.

When editing is necessary, an erasing magnetic head, positioned on a rotary drum at a location preceding the position of a recording magnetic head in the direction of rotation, traces the recording track. Signal re-recording is performed by the recording magnetic head after a flying erasure operation is performed by the erasure magnetic head for a period corresponding to the re-recording period. In a digital VTR for digital recording of video signals, the flying erasure operation is also occasionally performed for satisfactory signal re-recording during the editing. In this type of the signal recording apparatus, a separate erasure control circuit for supplying the electrical current to the erasure magnetic head in timed coordination with the re-recording period or the transmitting control signals is necessary. In addition, the power consumption is increased.

In the currently practiced digital VTRs, as shown for example in the Japanese Unexamined Patent Publication No. 36312/1984, the recording magnetic head and the erasure magnetic head are provided in proximity to each other. Control means for commonly controlling the operational timing of each of these magnetic heads is realized by a simplified circuit having a high power efficiency so as to overcome the above described inconveniences.

To perform an editing operation in such a signal recording apparatus, an erasure magnetic head is provided to the rotary drum. The recording track is erased by a flying erasure operation of the erasure magnetic head to effect satisfactory signal recording. When such a flying erasure operation is performed, a separate erasure control circuit is used for supplying the current to the erasure magnetic head in timed coordination with the re-recording period. In addition, a rotary transformer for transmitting the erasure control signals is necessary. As a result, in the digital VTRs shown in the above publication, distortions common to magnetic recording, such as peak shifts, are produced as a result of the non-return to zero (NRZ) recording. Thus, a circuit is needed to compensate for the distortions. Moreover, an adjustment operation is necessary at five to six points for each channel to provide a circuit constant for the compensation circuit.

OBJECTS AND SUMMARY OF THE INVENTION

It is an object of the present invention to provide a digital signal recording apparatus that is able to perform satisfactory signal recording.

It is another object of the present invention to provide a digital signal recording apparatus without complex timing circuitry and without a rotary transformer for transmitting control signals.

It is a further object of the present invention to provide a digital signal recording apparatus wherein the erasure magnetic head is driven by a current during the reference level period of a pulse train recording and wherein the power consumption for pulse train recording and flying erasure is about the same as the power consumption involved in conventional NRZ recording.

It is further object of the present invention to provide a digital signal recording apparatus wherein the power consumption may be reduced.

It is a further object of the present invention to provide a signal recording apparatus which has a smaller number of adjustment points and in which the compensating circuits for phase distortions such as the peak shifts may be dispensed with by pulse train recording.

It is a further object of the present invention to provide a digital signal recording apparatus in which the a.c. erasure current may be formed from the current of the reference level period using a simplified circuit.

It is yet another object of the present invention to provide a digital signal recording apparatus in which an erasure magnetic head is provided integral with a magnetic head adapted for performing pulse train recording and for performing flying erasure of the recording track formed by the recording magnetic head prior to rerecording, and in which an erasure current is supplied to the erasure magnetic head during the reference level period of the pulse train recording under control of the erasure control means.

The above and other objects and features of the present invention will become apparent from the following detailed description taken in con]unction with the drawings.

DETAILED DESCRIPTION OF THE PREFERRED EMBODIMENT

Figure 2:
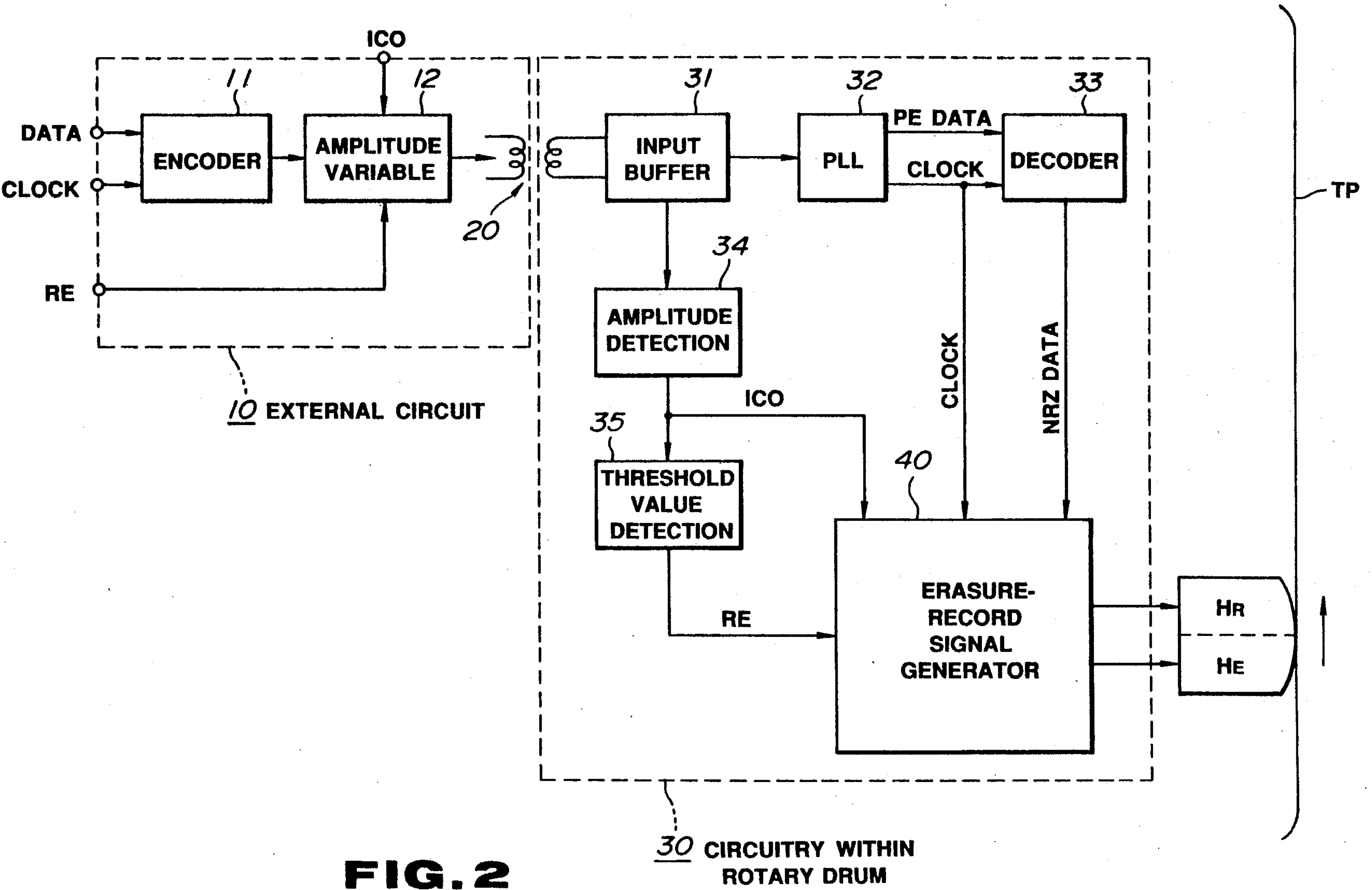
FIG. 2 is a block diagram showing the arrangement of an erasure/recording system for the digital signal recording device shown in FIG. 1.

The general arrangement of an erasure/recording system for an erasure magnetic head $H_E$ and a recording magnetic head $H_R$ for one channel of a digital VTR to which the present invention is applied is shown in FIG. 2.

In this digital VTR, the erasure magnetic head $H_E$ and the recording magnetic head $H_R$ are provided integrally and have a predetermined distance therebetween which is short enough not to affect the performance of the heads $H_E$ or $H_R$ or of a magnetic tape TP. The magnetic heads $H_E$ and $H_R$ are mounted at predetermined positions on the outer periphery of a rotary drum, not shown, so as to be rotated in physical contact with the magnetic tape TP. The head $H_E$ is adapted to erase the recording track formed by the recording magnetic head $H_R$ prior to the movement of the recording magnetic head $H_R$ along the track. This integral type erasure/recording magnetic head may be produced by bonding the heads $H_E$ and $H_R$.

Within the interior of the rotary drum, an internal circuit 30 is provided which is electrically connected with an external circuit 10 via a rotary transformer 20. The circuit 30 is connected with the magnetic heads $H_E$ and $H_R$.

As shown in FIG. 2, the external circuit 10 includes an encoder 11 and an amplitude variable circuit 12. A clock signal CLOCK of a predetermined period and a recording data signal DATA from a signal generator, not shown, are received at the encoder 11. A recording current control signal ICO and a record operation command signal or record enable signal $R_E$ from a system controller, not shown, are received at the amplitude variable circuit 12. The encoder 11 encodes the recording data DATA based on the clock signal CLOCK to modulate the data into data having a waveform suitable for transmission by the rotary transformer 20. The amplitude variable circuit 12 converts the signals supplied from the encoder 11 into signals having the amplitude corresponding to the record current control signal ICO and supplies these signals to the rotary transformer 20 when commanded by the record enable signal $R_E$.

The signals supplied to this rotary transformer 20 are transmitted thereby to the internal circuit 30 for receipt in the latter by an input buffer circuit 31. The signals pass to both a phase locked loop (PLL) circuit 32 and an amplitude detector 34. The PLL circuit 32 takes out the phase encoding or PE record data and the clock signals CLOCK from the output signals of the input buffer circuit 31, and then supplies these data and clocks to a decoder 33. The decoder 33 converts the PE record data into non-return to zero data (i.e., NRZ record data), based on the clock signals CLOCK. The amplitude detector 34 generates the record current control signals ICO in accordance with the amplitude of the output signals from the buffer circuit 31 to supply control signals to a threshold value detector 35. The detector 35 generates the record enable signal RE from the threshold value of the record current control signals ICO. The clock signals CLOCK, the NRZ record data, the record current control signals ICO and the record enable signals RE, outputted respectively from the PLL circuit 32, decoder 33, amplitude detector 34 and the threshold value detector 35, are supplied to an erasure/-recording signal generator 40. The current for driving the circuitry in the interior circuit 30 of the rotary drum for driving the magnetic heads $H_E$ and $H_R$ is supplied from the slip ring of a power rotary transformer, not shown. The internal circuit 30 can be formed without using the PLL circuit 32 if the clock signal CLOCK and the record data are adapted to be transmitted by separate rotary transformers.

Figure 1:
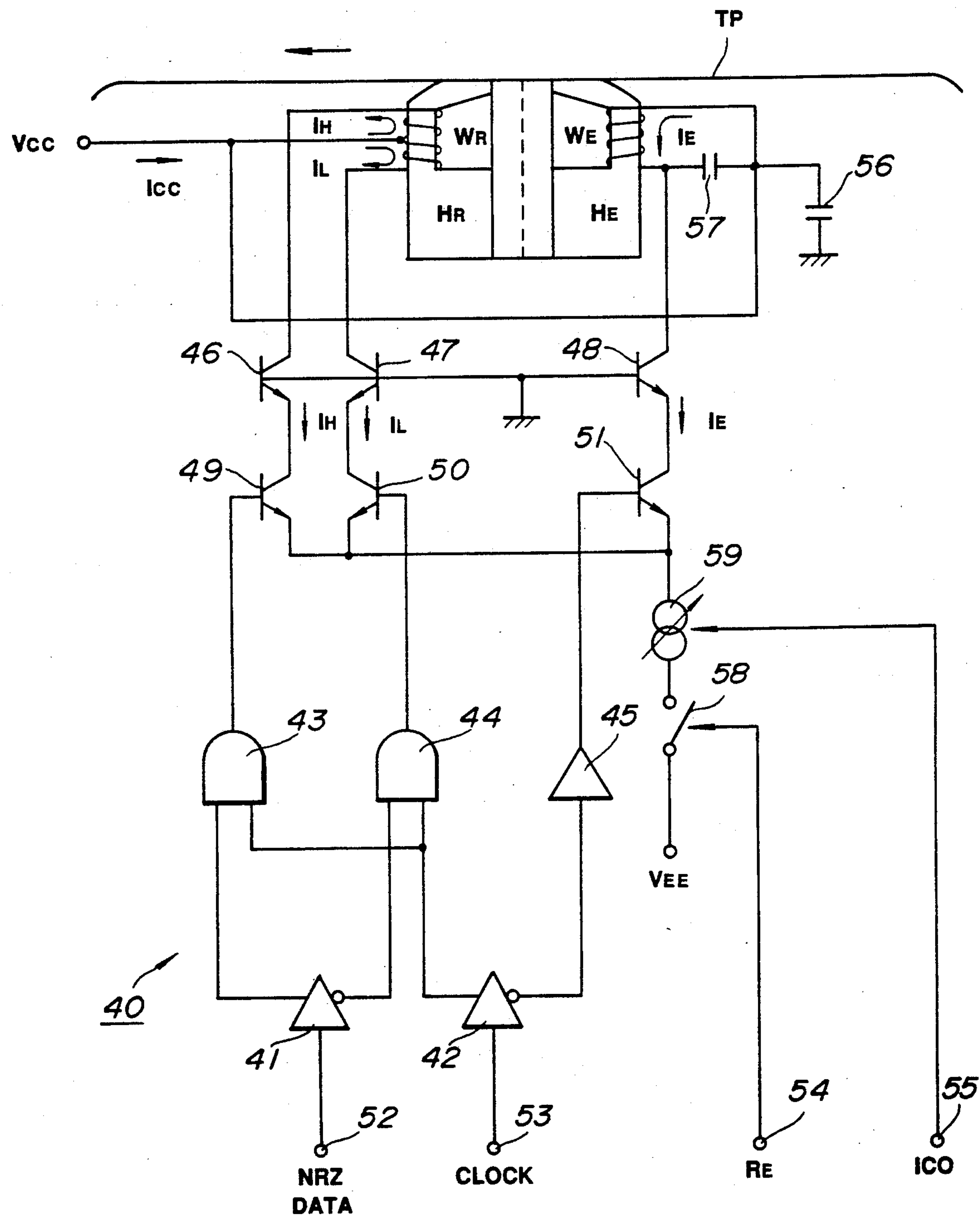
FIG. 1 is a circuit diagram showing an embodiment of a digital signal recording device according to the present invention.
Figure 3:
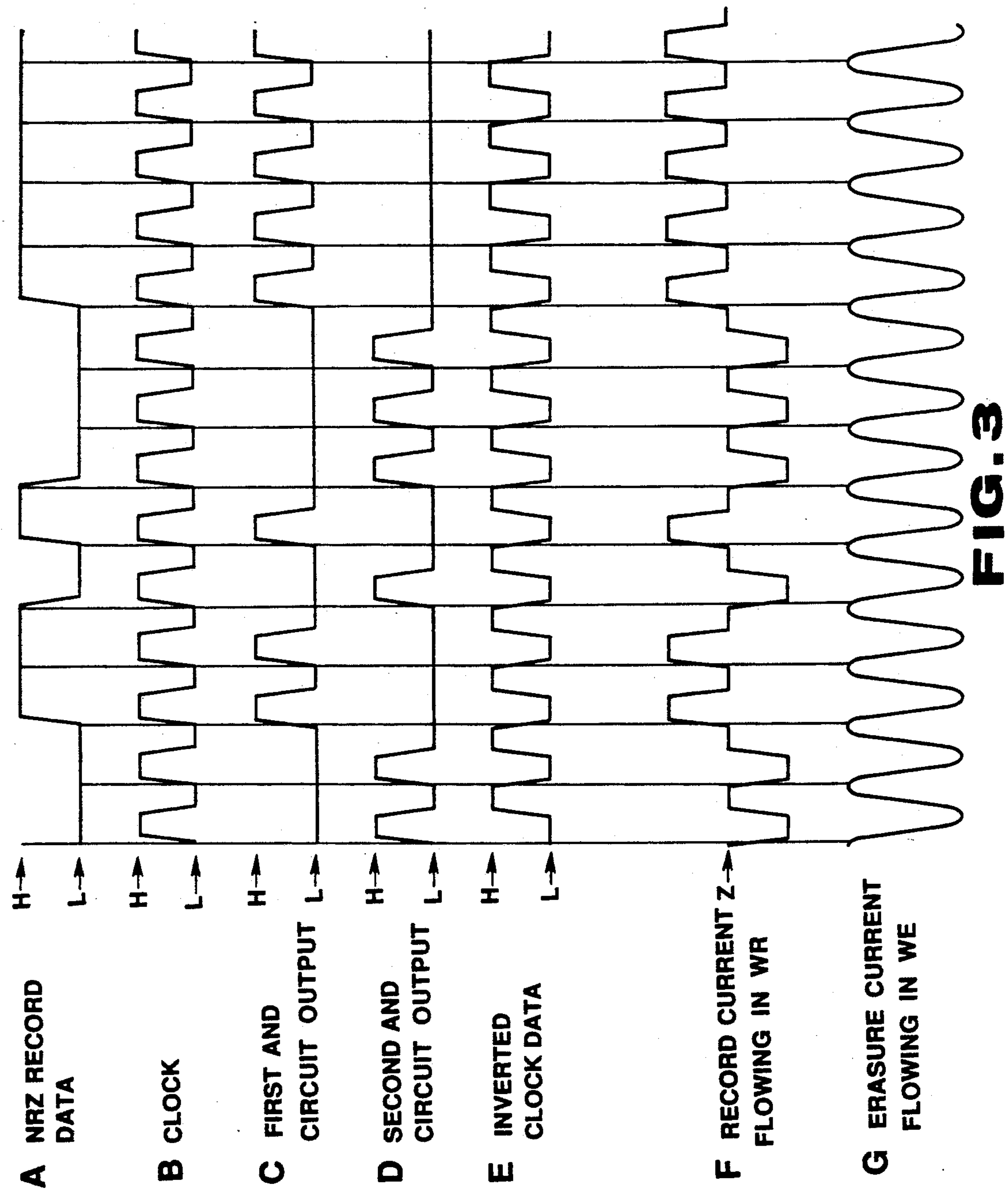
FIG. 3 is a waveform diagram to which reference will be made in explaining the operation of the digital signal recording device shown in FIG. 1.

As shown in FIG. 1, the erasure/recording signal generator 40 is generally composed of a logic circuit formed by emitter coupled logic ECL. The logic circuit includes two buffers 41, 42 each having an inverting output terminal, two AND circuits 43, 44 and a buffer 45, and three serially connected pairs of NPN transistors 46, 47; 48, 49; 50, 51. The NRZ record data, as shown at A in FIG. 3, are supplied to a data input terminal 52. The clock signals CLOCK have a period of one data length of the above described NRZ recording data and are supplied to a clock input terminal 53, as shown at B in FIG. 3.

In the above described erasure/recording signal generator 40, the NRZ recording data are received at the buffer 41. The non-inverted data thereof then are supplied to the AND circuit 43 while the inverted data thereof are supplied to the AND circuit 44. The clock signals CLOCK are received via the clock input terminal 53 at the buffer 42. The non-inverted clock data then are supplied to each of the AND circuits 43, 44. These AND circuits 43, 44 form logical product data from the NRZ record data and the clock signals CLOCK as shown at lines C and D in FIG. 3. The logical product data are output to the bases of the transistors 49, 50. From the inverting output terminal of the buffer 42, the inverted data of the clock signals CLOCK as shown at E in FIG. 3 are output to the base of the transistor 51 via buffer 45 at the same timing as the output data of the AND circuits 43, 44.

The coil $W_R$ of the recording magnetic head $H_R$ has one end connected via transistor 46 to the collector of the transistor 49, while having its other end connected via transistor 47 to the collector of transistor 50. The coil neutral point is connected to a positive voltage terminal Vcc of, for example, +10 V. The coil $W_E$ of the erasure magnetic head $H_E$ has one end connected to the positive voltage terminal Vcc and grounded via a decoupling capacitor 56, while having its other end connected to the collector of the transistor 51 via transistor 48. The coil $W_E$ of the erasure magnetic head $H_E$ further has its ends connected to each other through a capacitor 57. The bases of the transistors 46, 47 and 48 are connected in common. Each of the transistors 49, 50 and 51 has its emitter connected in common to a record current source 59 which in turn has its current value controlled in accordance with the record current control signal ICO received at a record current control signal input terminal 55. To this recording current source 59 is connected a negative voltage terminal $V_{EE}$ of, for example, −5V, via a switching circuit 58. This switching circuit is closed when a record operation is commanded by the mentioned record operation command signal or when a record enable signal $R_E$ is supplied to the switching circuit via a record operation command signal input terminal 54. Thus an electric current controlled to an optimum value in accordance with the record current control signal ICO flows from the emitters of the transistors 49, 50 and 51.

In the above arrangement, transistor 49 is turned on when the output data from the AND circuit 43 shown at C in FIG. 3 is "H", that is, during the period when the NRZ record data is "1" and the clock is "H". Transistor 50 is turned on when the output data of the AND circuit 44 supplied to the base of transistor 50 as shown at D in FIG. 3 is "H", that is, during the period when the NRZ record data is "0"and the clock is "H". Transistor 51 is turned on when the inverted data of the clock signal CLOCK supplied to the base of transistor 51 as shown at E in FIG. 3 is "H", that is, when the above clock signal is "L".

When the transistor 49 is turned on in the course of the recording operation, the current as shown by an arrow marked Icc in FIG. 1 flows from the positive voltage terminal VCC through the neutral point of the coil $W_R$ into transistors 46, 49 to the recording current source 59, as shown by arrows marked $I_H$ in FIG. 1. On the other hand, when the transistor 50 is turned on during the above period in the course of the recording operation, the current flows through the neutral point of the coil $W_R$ and out the other side of the coil $W_R$ into transistors 47, 50 to the recording current source 59, as indicated by the arrows marked $I_L$ in FIG. 1. In this manner, the recording current shown at F in FIG. 3 is generated. Such recording current flows in the coil $W_R$ in such a manner that the current flows in a direction associated with the state of "H" or "L" of the NRZ recording data during the "H" period of the clock signal CLOCK. The current, however, is at the zero reference level "Z" during the "L" period of the clock signal CLOCK. A pulse train recording is achieved on the magnetic tape TP by a magnetic field produced in the recording magnetic head $H_R$ by this recording current.

Figure 4:
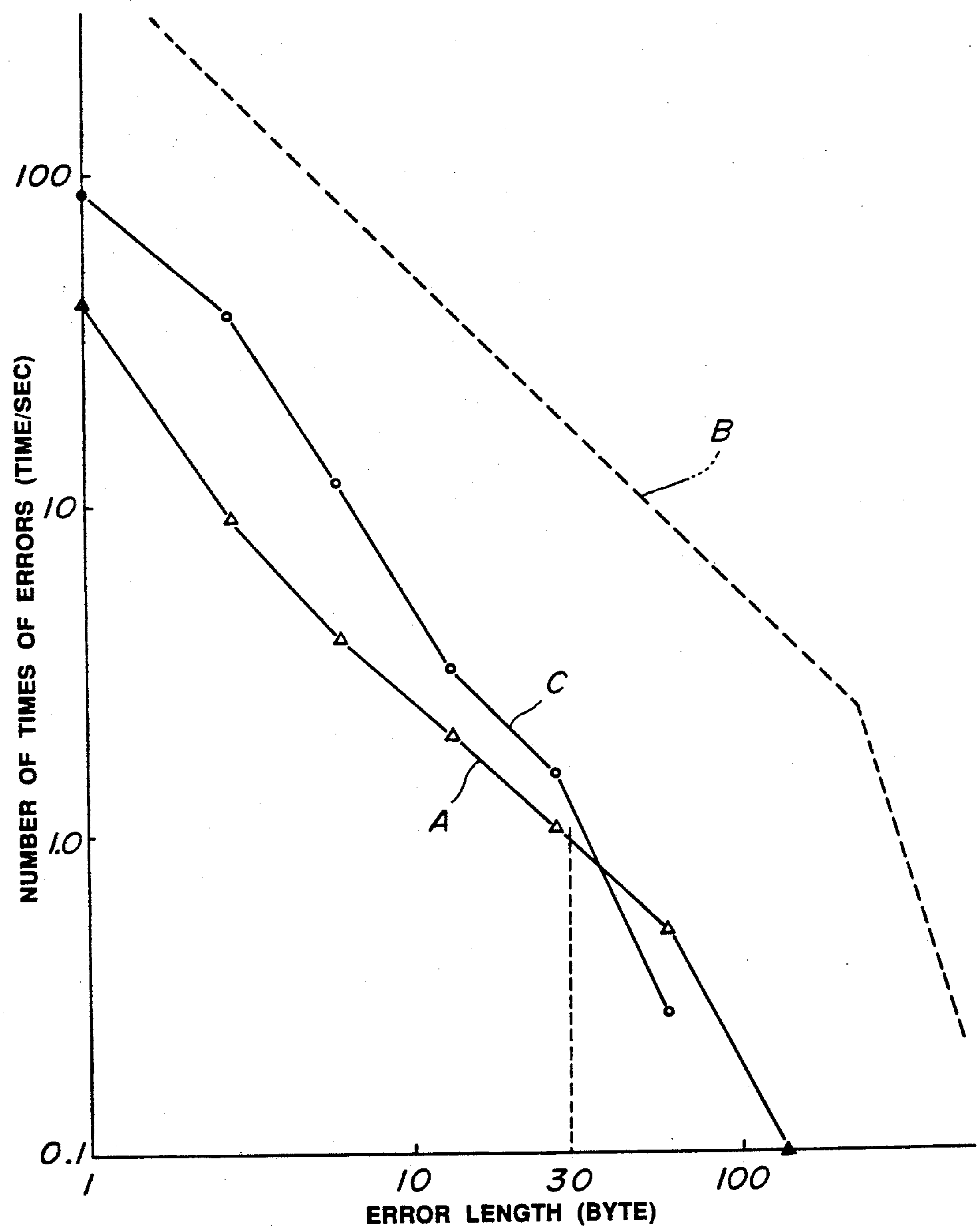
FIG. 4 is a graph illustrating the characteristics of the digital signal recording device shown in FIG. 1.

During the period in the recording operation when the above recording current is at the reference level "Z" transistor 51 is turned on, as described above, when the clock signal is "L", so that the current shown by the arrow marked Icc flows via coil $W_E$ of the erasure magnetic head $H_E$ and transistors 48, 51 to the recording current source 59, as shown by arrows marked $I_E$ in FIG. 1. Thus an a.c. erasure current having a period equal to one clock period as shown at G in FIG. 3 is produced in the coil $W_E$, which a.c. erasure current is formed by a parallel resonance circuit constituted by the coil $W_E$ and the capacitor 57. The a.c. magnetic field produced in the erasure magnetic head $H_E$ subjects the magnetic tape TP to an a.c. erasure prior to the above described pulse train recording. The a.c. erasure generally exhibits an erasure performance better than that of the d.c. erasure achieved by the d.c. magnetic field. This a.c. erasure, however, has not been in popular use because of the complexity and bulky size of the erasure circuit and its excessive power consumption. In the present embodiment, an a.c. erasure is performed by an a.c. erasure current which is formed by the above parallel resonance circuit based on the recording current supplied at each period of the reference level "Z". The pulse train recording and the a.c. erasure may be realized with the power consumption about equal to that for conventional NRZ recording without employing complicated circuits FIG. 4 statistically shows the status of the errors produced in the data recorded and reproduced in the 4:2:2 digital VTR provided with four channels of the above described erasure and recording system. In this figure, the ordinate denotes the number of times errors appear in each second, while the abscissa denotes the error length in bytes. The number of times errors are caused in the data obtained by a.c. erasure as applied according to the present invention is shown by a solid line A. The number of times errors appear using the SMPTE model is shown by the curve B and using the conventional dc erasure is shown by the curve C. Note that the number of errors according to the present invention is significantly smaller than the number of errors in the case of the SMPTE model. Even when compared with the case of the errors caused in the data obtained by the conventional d.c. erasure followed by NRZ recording, the number of times errors appear shorter than 30 bytes, which represents the major occurrence of the errors, is reduced to about one half or one fourth.

In the above described erasure/recording signal generator 40, the transistors 49, 50 and 51 are turned on alternately, so that the current shown by the arrow $I_H$, $I_L$ or $I_E$ is supplied from one of these transistors to the above recording current source 59. These currents are supplied via transistors 46, 47 and 48 to the transistors 49, 50 and 51, so that, even when the currents of a larger amplitude are supplied to the collectors of the transistors 46, 47 and 48 during different period, the effects on the transistors 49, 50 and 51 may be reduced.

In the above described embodiment, the recording tracks formed by the recording magnetic head $H_R$ are subjected to rotational erasure by an a.c. magnetic field by the erasure magnetic head $H_E$ prior to pulse train recording. Thus, the recording data may be recorded on the magnetic tape TP with a good S/N ratio not only during the ordinary recording but also during editing, so that the errors at the time of the reproduction may be reduced significantly. The erasure magnetic head $H_E$ is provided integral with the magnetic head $H_R$ and, disposed at a short distance from the recording magnetic head $H_R$. The erasure current is adapted to flow in the coil $W_E$ during the time when the recording magnetic head $H_R$ is performing the recording operation, so as to dispense with complex circuitry for timing and also with a rotary transformer for control signal transmission. In addition, the recording current during the reference level period of the pulse train recording is used as the erasure current supplied to the erasure magnetic head $H_E$, so that the recording current source 59 provided for driving the recording magnetic head $H_R$ may be used simultaneously as the current source for the erasure current. The pulse train recording and the a.c. erasure may be achieved with the power consumption about equal to that in the case of the conventional NRZ recording which is not pulse train recording. With the pulse train recording, phase distortions such as peak shifts caused in the conventional NRZ recording may be reduced and the compensation circuits therefor may be dispensed with. The result is that the adjustment point is solely the record current value of the record current control signal ICO.

What is claimed is:

1. A digital signal recording apparatus for pulse train recording of an input digital signal on a recording medium guided by a rotary drum, said apparatus comprising:

an input terminal receiving said input digital signal;

recording head means mounted on said rotary drum for relative movement in respect to said recording medium;

erasing head means mounted on said rotary drum adjacent to said recording head means at a location preceding said recording head means considered in the direction of said relative movement;

a clock signal source for providing a clock signal having a predetermined period;

means responsive to said input digital signal and said clock signal for applying to said recording head means a recording current which takes one of first or second levels during a first portion of each said period of the clock signal and which returns to a reference level during a second portion of each said period for effecting said pulse train recording; and control means for controlling said erasing head means during said second portion of each said period of the clock signal when said recording current is at said reference level such that an erasing current then flows in said erasing head means for erasing a previously recorded signal before said pulse train recording.

2. A digital signal recording apparatus according to claim 1, wherein said control means includes current source means for supplying an erasing current to said erasing head means during said second portion of each said period of the clock signal, and said erasing head means includes a resonant circuit by which said erasing current flowing through said erasing head means is given a sinusoidal wave form having the same frequency as said clock signal.

3. A digital signal recording apparatus according to claim 2, wherein said erasing head means has a coil included in said resonant circuit which further includes a capacitor.

4. A digital signal recording apparatus according to claim 3, wherein said current source means includes erasing transistor means controlled by said clock signal, said erasing transistor means having approximately a 50% duty cycle.

5. A digital signal recording apparatus according to claim 4, wherein said means for applying the recording current includes first and second transistor means, said first transistor means being turned ON for providing said recording current at said first level thereof in response to a first control signal corresponding to a first level of said input digital signal and said second transistor means being turned ON for providing said recording current at said second level thereof in response to a second control signal corresponding to a second level of said input digital signal.

6. A digital signal recording apparatus according to claim 5, wherein said means for applying the recording current further includes means for alternatively generating said first or said second control signal during said first portion of each said period of the clock signal.

7. A digital signal recording apparatus according to claim 1, wherein said means for applying the recording current and said control means are mounted in said rotary drum.

8. A digital signal recording apparatus according to claim 1, wherein said recording head means and said erasing head means are mechanically integrated with each other.

9. A digital signal recording apparatus for pulse train recording of an input digital signal on a recording medium guided by a rotary drum, said apparatus comprising:

- an input terminal receiving said input digital signal;
- recording head means mounted on said rotary drum for relative movement in respect to said recording medium;
- erasing head means mounted on said rotary drum adjacent to said recording head means at a location preceding said recording head means considered in the direction of said relative movement;
- a clock signal source for providing a clock signal having a predetermined period;
- means responsive to said input digital signal and said clock signal for applying to said recording head means a recording current which takes one of first or second levels during a first portion of each said period of the clock signal and which returns to a reference level during a second portion of each said period for effecting said pulse train recording, said means for applying the recording current including first and second transistor means which are alternatively turned ON during said first portion of each said period of the clock signal for providing said recording current at said first and second levels, respectively, in response to first and second control signals, respectively, buffer means supplied with said input digital signal and generating inverted and non-inverted output signals, first AND gate means supplied with said non-inverted output signal and said clock signal for generating said first control signal in response to a first level of said input digital signal during said first portion of each said period, and second AND gate means supplied with said inverted output signal and said clock signal for generating said second control signal in response to a second level of said input digital signal during said first portion of each said period; and control means for controlling said erasing head means during said second portion of each said period of the clock signal when said recording current is at said reference level such that an erasing current then flows in said erasing head means for erasing a previously recorded signal before said pulse train recording.

10. A digital signal recording apparatus for pulse train recording of an input digital signal on a recording medium guided by a rotary drum, said apparatus comprising:

- an input terminal receiving said input digital signal;
- recording head means mounted on said rotary drum for relative movement in respect to said recording medium;
- erasing head means mounted on said rotary drum adjacent to said recording head means at a location preceding said recording head means considered in the direction of said relative movement;
- a clock signal source for providing a clock signal having a predetermined period;
- means responsive to said input digital signal and said clock signal for applying to said recording head means a recording current which takes one of first second levels during a first portion of each said period of the clock signal and which returns to a reference level during a second portion of each said period for effecting said pulse train recording, said means for applying the recording current including first and second transistor means which are alternatively turned ON for providing said recording current at said first and second levels, respectively, in response to first and second control signals, respectively, buffer means supplied with said input digital signal and generating inverted and non-inverted output signals, first AND gate means supplied with said non-inverted output signal and said clock signal for generating said first control signal in response to a second level of said input digital signal during said first portion of each said period and second AND gate means supplied with said inverted output signal and said clock signal for generating said second control signal in response to a second level of said input digital signal during said first portion of each said period; and
- control means for controlling said erasing head means during said second portion of each said period of the clock signal when said recording current is at said reference level such that an erasing current then flows in said erasing head means for erasing a previously recorded signal before said pulse train recording, said control means including current source means having erasing transistor means controlled by said clock signal and having approximately a 50% duty cycle for supplying said erasing current to said erasing head means during said second portion of each said period, and said erasing head means has a coil connected with a capacitor to form a resonant circuit by which said erasing current is given a sinusoidal wave form having the same frequency as said clock signal.

11. A digital signal recording apparatus according to claim 10, wherein each of said first, second and erasing transistor means includes a common emitter transistor and a common base transistor connected in cascade fashion.

* * * * *